US012756457B2

(12) United States Patent
Tang et al.

(10) Patent No.: US 12,756,457 B2
(45) Date of Patent: Oct. 6, 2026

(54) INROUTE STREAM ERROR RATE SHEDDING

(71) Applicant: Hughes Network Systems, LLC, Germantown, MD (US)

(72) Inventors: Yeqing Tang, North Potomac, MD (US); Raghu Narasimhan, Germantown, MD (US); Francis Selvadoss, Damascus, MD (US); Venkat Ganesan, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 317 days.

(21) Appl. No.: 18/655,934

(22) Filed: May 6, 2024

(65) Prior Publication Data

US 2025/0343599 A1 Nov. 6, 2025

(51) Int. Cl.
*H04B 7/185* (2006.01)

(52) U.S. Cl.
CPC ................................ *H04B 7/18519* (2013.01)

(58) Field of Classification Search
CPC . H04B 7/18519; H04B 7/18513; H04L 1/203; H04L 41/0659; H04L 43/16; H04L 43/50; H04L 1/0015; H04L 43/0847
USPC ....... 370/316, 242–248, 331; 455/3.02, 12.1, 455/427, 436–445
See application file for complete search history.

(56) References Cited

U.S. PATENT DOCUMENTS

| | | | | |
|---|---|---|---|---|
| 10,367,578 | B2 | 7/2019 | Xu et al. | |
| 2009/0003195 | A1* | 1/2009 | Pitchforth, Jr. ......... | H04L 45/22 370/218 |
| 2020/0245192 | A1 | 7/2020 | Roy et al. | |
| 2021/0409262 | A1* | 12/2021 | Watson ................... | H04L 43/50 |
| 2022/0140891 | A1* | 5/2022 | Roy ................... | H04B 7/18515 370/316 |
| 2023/0370160 | A1 | 11/2023 | Roy et al. | |

* cited by examiner

*Primary Examiner* — Michael Y Mapa
(74) *Attorney, Agent, or Firm* — Kilpatrick Townsend & Stockton LLP

(57) ABSTRACT

Techniques are described herein for intelligent shedding of inroutes determined to have high burst error rates. Embodiments operate in context of a multi-spot beam satellite communication system that uses time-division multiple access (TDMA) communication protocols and inroute groups. Burst error rates of inroutes can be monitored over time to identify bad inroutes. Each bad inroute can be shut down and quarantined. After a predetermined amount of time, one or more selected terminals can be redistributed to the bad inroutes, and the burst error rates of those inroutes can be monitored again to determine whether those inroutes should remain quarantined. If an inroute is no longer bad, it can be removed from quarantine and returned to an inroute group list. If the inroute is still bad, it can be periodically re-checked until it ultimately improves, is permanently quarantined, etc.

20 Claims, 7 Drawing Sheets

INROUTE STREAM ERROR RATE SHEDDING

BACKGROUND

Satellite communication systems provide communication services to large numbers of customers around the world. In a satellite communication system, communication paths can be categorized into inroutes and outroutes. Inroutes refer to the uplink paths by which signals (e.g., data packets) are sent from user ground terminals to a satellite, and outroutes refer to the downlink paths by which signals are sent from the satellite to the user ground terminals. A present quantity of burst error rates in inroutes of a satellite communication system can be a present indicator of the system's quality and reliability, as high inroute burst error rates can lead to appreciable data loss, reduced throughput, increased latency, and/or other negative impacts. Conventionally, satellite communication systems employ various types of error correction and mitigation techniques to detect and correct errors within the transmitted data. Although such approaches can help improve the reliability of communications, such approaches can also create substantial inefficiencies, particularly in cases where high burst error rates are limited to particular inroutes and/or are persistent in particular inroutes.

SUMMARY

Systems and methods are described herein for intelligent shedding of inroutes determined to have high burst error rates. Embodiments operate in context of a multi-spot beam satellite communication system that uses time-division multiple access (TDMA) communication protocols and inroute groups. Burst error rates of inroutes can be monitored over time to identify bad inroutes. Each bad inroute can be shut down and quarantined. After a predetermined amount of time, one or more selected terminals can be redistributed to the bad inroutes, and the burst error rates of those inroutes can be monitored again to determine whether those inroutes should remain quarantined. If an inroute is no longer bad, it can be removed from quarantine and returned to an inroute group list. If the inroute is still bad, it can be periodically re-checked until it ultimately improves, is permanently quarantined, etc.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Satellite communication systems, such as high-throughput satellite (HTS) communication systems, provide communication services to large numbers of customers around the world. For example, HTS Such systems can include a multi-spot beam architecture that operates at Ka-band or Ku-band frequencies (or other satellite frequency bands), to provide broadband internet services, broadcasting, voice, and other communication services over wide geographic areas. Technologies, such as beam hopping and time division multiplexing, facilitate reuse of frequencies across different spot beams to provide very high system capacity and efficiency.

Figure 1:
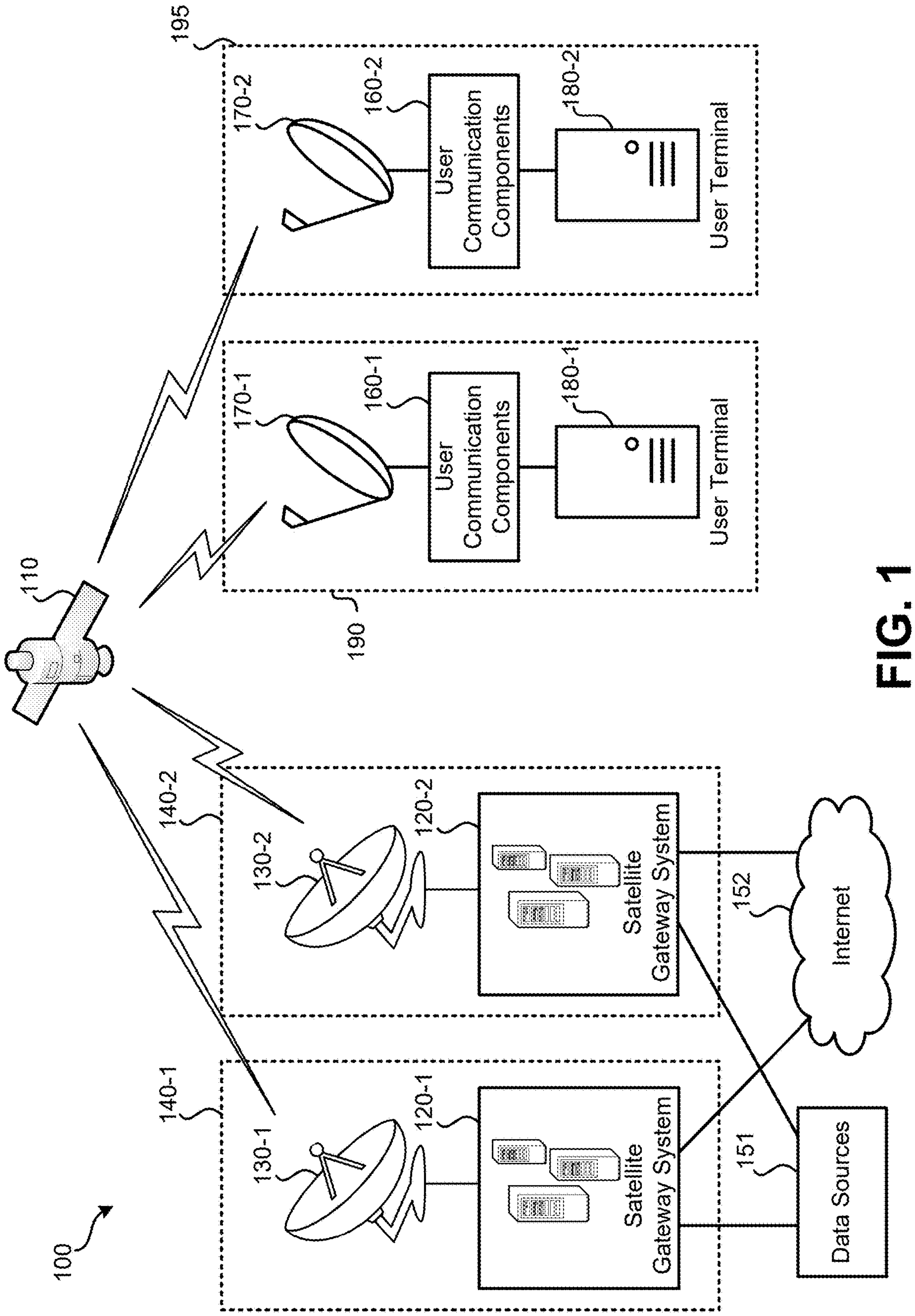
FIG. 1 illustrates an embodiment of a bidirectional satellite communication system as a context for embodiments described herein.

FIG. 1 illustrates an embodiment of a bidirectional satellite communication system 100 as a context for embodiments described herein. Bidirectional satellite communication system 100 may include: satellite 110; satellite gateway systems 120; bidirectional satellite communication links 130; data sources 151; user communication components 160; satellite antennas 170; and user terminals 180. Satellite 110 may be a bidirectional communication satellite that relays communications between satellite gateway systems 120 and user communication components 160. In some embodiments, satellite 110 is a bent-pipe, or "non-processing" satellite. In other embodiments, the satellite 110 is a processing satellite (e.g., it includes on-board waveform processing, and/or other features). Via satellite 110, data may be transmitted from satellite gateway systems 120 for receipt by user communication components 160; and data may be transmitted from user communication components 160 for receipt by satellite gateway systems 120.

In some embodiments, system 100 may be used to provide user communication components 160 with Internet access, and/or access to any other suitable public and/or private networks. Additionally or alternatively, system 100 may be used to provide user communication components 160 with access to one or more data source 151, which may be a private network, data source, or server system. In some architectures, satellite gateway systems 120 are in communication with backhaul infrastructure, terrestrial networks, and/or other communications infrastructure.

Satellite 110 may use different frequencies for communication with satellite gateway systems 120 than for communication with user communication components 160. Further, different frequencies may be used for uplink communications than for downlink communications. For example, different frequency bands, sub-bands, etc. can be used for some or all of forward uplink communications (satellite gateway system 120 to satellite 110), forward downlink communications (satellite 110 to user communication components 160), return uplink communications (user communication components 160 to satellite 110), and return downlink communications (satellite 110 to satellite gateway system 120).

Each satellite gateway system 120 is located at a respective geographic location 140. For example, satellite gateway system 120-1 communicates with satellite 110 using bidirectional satellite communication link 130-1, which can include one or more high-gain antennas that allow high data transmission rates between satellite gateway system 120-1 and satellite 110. Satellite gateway system 120-1 may receive data from and transmit data to many instances of user equipment, such as user communication components 160. Satellite gateway system 120-1 may encode data into a proper format for relaying by satellite 110. Similarly, satellite gateway system 120-1 may decode data received from various instances of user communication components 160 received via satellite 110.

Satellite gateway system 120-1 may serve as an intermediary between the satellite communication system and other data sources, such as data sources 151 and Internet 152. Satellite gateway system 121 may receive requests from user communication components 160 via satellite 110 for data accessible using Internet 152. Satellite gateway system 120-1 may retrieve such data from Internet 152 and transmit the retrieved data to the requesting instance of user equipment via satellite 110. Additionally or alternatively, satellite gateway system 120-1 may receive requests from user communication components 160 via satellite 110 for data accessible in data sources 151. Satellite gateway system 120-1 may retrieve such data from data sources 151 and transmit the retrieved data to the requesting instance of user equipment via satellite 110.

Satellite gateway system 120-2 may function similarly to satellite gateway system 120-1, but may be located in a different physical location. While satellite gateway system 120-1 is located at geographic location 140-1, satellite gateway system 120-2 is located at geographic location 140-2. Co-located with satellite gateway system 120-2 may be bidirectional satellite communication link 130-2. Satellite gateway system 120-2 and bidirectional satellite communication link 130-2 may service a first group of user equipment while satellite gateway system 120-1 and bidirectional satellite communication link 130-1 may service another set of user equipment. Satellite gateway system 120-2 and bidirectional satellite communication link 130-2 may function similarly to satellite gateway system 120-1 and bidirectional satellite communication link 130-1 respectively.

Embodiments can use various techniques to mitigate interference between gateway systems 120. Some embodiments mitigate interference by geographic diversity. For example, geographic locations 140-1 and 140-2 may be separated by a significant enough distance such that the same frequencies can be used for uplink and downlink communications between bidirectional satellite communication links 130 and satellite 110 without a significant amount of interference occurring. Other embodiments use frequency diversity (e.g., multiple colors, such as different frequency bands or sub-bands) between adjacent gateway systems 120. Other embodiments use temporal diversity (e.g., different communication timing) between adjacent gateway systems 120.

While two instances of satellite gateway systems 120 and bidirectional satellite communication links 130 are illustrated as part of system 100, it should be understood that in some embodiments only a single satellite gateway system and a single bidirectional satellite communication link system are present or a greater number of satellite gateway systems 120 and bidirectional satellite communication links 130 are present. For example, for a satellite-based Internet service provider, four to eight (or significantly more) satellite gateway systems 120 and associated bidirectional satellite communication links 130 may be scattered geographically throughout a large region, such as North America.

User communication components 160, along with user terminals 180 and satellite antennas 170 (which can collectively be referred to as "user equipment") may be located in a fixed geographic location or may be mobile. For example, user communication components 160-1, satellite antenna 170-1, and user terminal 180-1 may be located at a residence of a subscriber that has a service contract with the operator of satellite gateway systems 120. The term "user" is intended only to distinguish from the gateway side of the network 100. For example, user terminal 180 can be associated with an individual subscriber to satellite communication services, with a corporate or other entity user, with a robotic user, with an employee of the satellite communication services provider, etc.

User communication components 160-1, satellite antenna 170-1, and user terminal 180-1 may be located at a fixed location 190. Fixed location 190 may be a residence, a building, an office, a worksite, or any other fixed location at which access to Internet 152 and/or private data source 151 is desired. User communication components 160-2, satellite antenna 170-2, and user terminal 180-2 may be mobile. For instance, such equipment may be present in an airplane, ship, vehicle, or temporary installation. Such equipment may be present at geographic location 195; however, geographic location 195 may change frequently or constantly, such as if the airplane, ship, or vehicle is in motion.

Satellite antenna 170-1 may be a small dish antenna, approximately 50 to 100 centimeters in diameter. For example, a small dish antenna can be integrated with some or all of the user communication components 160 and user terminal 180 to form a very small aperture terminal (VSAT). The VSAT can be a fixed VSAT (e.g., having an indoor unit inside of a customer premises communicatively coupled with an outdoor unit outside of the customer premises) or the VSAT can be a mobile VSAT.

Satellite antenna 170-1 may be mounted in a location that is pointed towards satellite 110, which may be in a geosynchronous orbit around the earth (i.e., the satellite 110 is a geosynchronous, or GEO, satellite). As such, the direction in which satellite antenna 170-1 is to be pointed stays constant. In some embodiments, low Earth orbit (LEO) and medium Earth orbit (MEO) satellites may be used in place of a geosynchronous satellite in the system. In some embodiments, satellite 110 is a high-throughput multi-beam satellite that communicates with user terminals using multiple (e.g., hundreds of) spot beams. In case of a multi-beam GEO satellite, for example, each of the multiple spot beams illuminates a respective coverage area. A fixed-location user terminal 180 can communicate with the satellite 110 generally via a particular one of the spot beams, unless there is some reason to reassign the user terminal 180 (e.g., in case of a gateway system 120 outage). Communications with mobile user terminals 180 can be handed off between spot beams as the mobile user terminal 180 moves through different coverage areas. In the case of non-GEO (e.g., MEO or LEO) satellites 110, spot beam coverage areas typically trace a path across the surface of the Earth with changes in the satellite's position relative to the Earth.

User communication component 160-1 refers to the hardware necessary to translate signals received from satellite 110 via satellite antenna 170-1 into a format which user terminal 180-1 can decode. Similarly, user communication components 160-1 may encode data received from user terminal 180-1 into a format for transmission via satellite antenna 170-1 to satellite 110. User communication components 160-1 may include a satellite communication modem. This modem may be connected with or may have incorporated a wired or wireless router to allow communication with one or more user terminals. In system 100, a single user terminal, user terminal 180-1, is shown in communication with user communication components 160-1. It should be understood that, in other embodiments, multiple user terminals may be in communication with user communication components 160-1. User terminal 180-1 may be various forms of computerized devices, such as: a desktop computer; a laptop computer; a smart phone; a gaming system or device; a tablet computer; a music player; a smart home device; a smart sensor unit; Voice over IP (VoIP) device, or some other form of computerized device that can access Internet 152 and/or private data source 151. Since user communication components 160 and a satellite antenna 170 can continue communicating with a satellite gateway system even if a user terminal 180 is not currently communicating with user communication components 160-1, it should be understood that some instances of user equipment may not include a user terminal 180.

Despite being in motion or in a temporary location, user communication components 160-2, satellite antenna 170-2, and user terminal 180-2 may function similarly to user communication components 160-1, satellite antenna 170-1, and user terminal 180-1. In some instances, satellite antenna 170-2 may either physically or electronically point its antenna beam pattern at satellite 110. For instance, as a flight path of an airplane changes, satellite antenna 170-2 may need to be aimed in order to receive data from and transmit data to satellite 110. As discussed in relation to user terminal 180-1, only a single user terminal, user terminal 180-2, is illustrated as in communication with user communication components 160-2 as part of system 100. It should be understood that in other embodiments, multiple user terminals may be in communication with user communication components 160-2. For example, if such equipment is located on an airplane, many passengers may have computerized devices, such as laptop computers and smart phones, which are communicating with user communication components 160-2 for access to Internet 152 and/or private data source 151. As detailed in relation user terminal 180-1, user terminal 180-2 may be various forms of computerized devices, such as those previously listed.

While FIG. 1 illustrates only two instances of user communication components 160, two instances of satellite antennas 170, and two instances of user terminals 180, system 100 may involve any suitable number (e.g., hundreds or thousands) of instances of satellite antennas, user equipment, and user terminals distributed across various geographic locations. Some number of these instances may be in relatively fixed locations, while others of these instances may have periodically or constantly changing locations (e.g., mobile terminals, or aero terminals for providing Internet service in aircraft, or the like). Further, while only a single satellite 110 is shown, some architectures include multiple satellites, such as cooperating satellites in a constellation, multiple satellites with overlapping coverage areas, etc.

In the satellite communication system 100, communication paths can be categorized into inroutes and outroutes. Inroutes refer to the uplink paths by which signals (e.g., data packets) are sent from user ground terminals to a satellite. For example, communications from satellite antennas 170 to satellite 110 are via inroutes (or "inroute channels"). Outroutes refer to the downlink paths by which signals are sent from the satellite to the user ground terminals. For example, communications from satellite 110 to satellite antennas 170 are via outroutes (or "outroute channels"). Satellite communication system architectures can seek to manage and optimize the flow of information over inroutes and outroutes in an efficient and reliable manner.

Focusing on inroutes, burst error rates can be a key performance metric to represent a communication system's quality and reliability. Burst errors are sequences of errors that occur in a row within a transmitted data stream (i.e., over a consecutive stream of data). Such errors can result from several causes. One cause is atmospheric conditions, such as rain fade, ionospheric disturbances, and solar flares, which can tend to absorb and/or scatter transmitted signals and cause temporary loss or degradation of a communication link. Another cause is multipath interference, whereby signals reflecting off the Earth's surface or other objects can create multiple paths that arrive at the receiver at slightly different times and result in interference. Another cause is physical obstructions, which can obstruct the line-of-sight path between ground terminals and a satellite, causing signal fading and burst errors. Another cause is equipment failures or misalignments (e.g., of antennas, transceivers, etc.), which can lead to poor signal quality and increased error rates. Another cause is doppler shift resulting from relative motion between satellites and ground terminals, which can impact signal frequency and can lead to errors, if not properly compensated.

Presence of high burst error rates in a satellite communication system can lead to appreciable data loss, reduced throughput, increased latency, and/or other negative impacts to quality of service. Typically, satellite communication systems employ various types of error correction and mitigation techniques, such as forward error correction (FEC) codes, adaptive modulation and coding (AMC), and automatic repeat request (ARQ) protocols. Such approaches seek to detect and correct errors within the transmitted data, thereby improving the reliability of the communications. However, particularly in cases where high burst error rates are limited to particular inroutes and/or are persistent in particular inroutes, conventional error correction and mitigation techniques can create substantial inefficiencies. For example, ensuring reliable communications over impacted inroutes can involve applying FEC and/or AMC with large amounts of overhead, repeating large numbers of transmissions, etc.

Embodiments described herein intelligently shed inroutes determined to have high burst error rates. For example, inroute burst error rates can be monitored over time to identify bad inroutes. Each bad inroute can be shut down and quarantined. After a predetermined amount of time (i.e., a shutdown timer), one or more selected terminals can be redistributed to the bad inroutes, and the burst error rates of those inroutes can be monitored again to determine whether those inroutes should remain quarantined. If an inroute is no longer bad, it can be removed from quarantine and returned to an inroute group list. If the inroute is still bad, it can be periodically re-checked until it ultimately improves, is permanently quarantined, etc.

Figure 2:
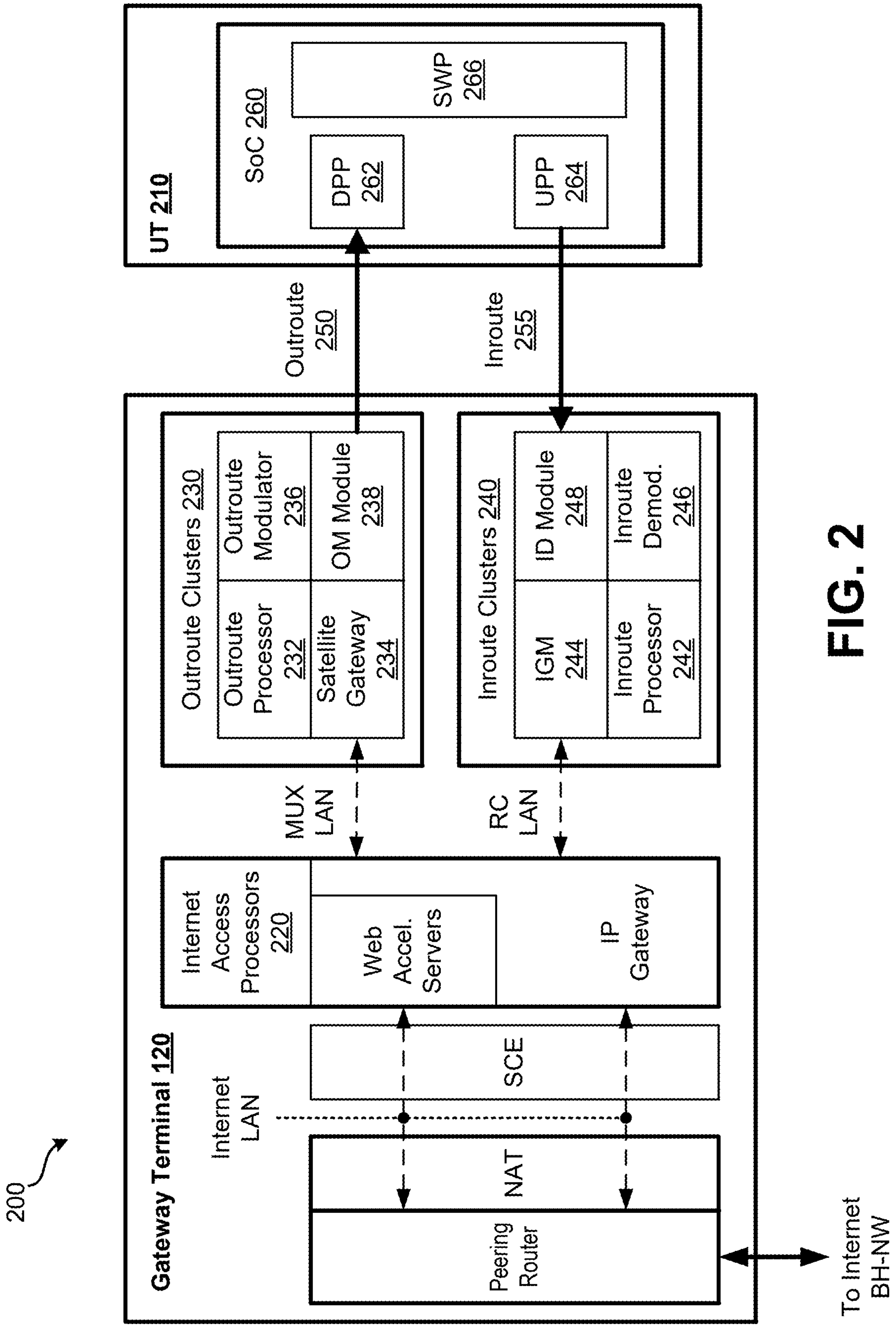
FIG. 2 shows a block diagram of a partial satellite communication system architecture that includes a gateway terminal in communication with a user terminal.

FIG. 2 shows a block diagram of a partial satellite communication system architecture 200 that includes a gateway terminal 120 in communication with a user terminal 210. The gateway terminal 120 can be an implementation of the gateway 120 of FIG. 1. The user terminal 210 can be a general representation of any suitable user-side components, such as components of the communication components 160 and/or user terminal 180 of FIG. 1 (e.g., integrated into a VSAT, or other suitable user terminal). A back-end portion of the gateway terminal 120 can include components for facilitating communications with the Internet (e.g., via an Internet backhaul network). In the illustrated implementation, such components can include a peering router, network address translation (NAT) unit, service control entity (SCE), and Internet access processors 220.

The peering router facilitates the exchange of data between the satellite network and external networks, ensuring efficient routing and handling of IP (Internet Protocol) packets to and from the Internet backhaul network. The Internet backhaul network represents a series of high-capacity transmission links and intermediate routers that connect the satellite gateway terminal 120 to the broader Internet infrastructure, enabling the distribution of satellite communications to the global Internet network. The NAT can translate private IP addresses used within the satellite network into public IP addresses for communication over the Internet, and vice versa. This can help to preserve the limited pool of public IP addresses and to ensure secure communication by hiding internal network details from external entities. The SCE can manage quality of service (QoS) and can enforce policies related to traffic shaping and prioritization. For example, the SCE analyzes and controls the flow of data traffic, applying predefined rules to manage bandwidth allocation and prioritize different types of data traffic, such as video streaming or web browsing, according to their requirements for latency, throughput, and jitter.

As illustrated, the Internet access processors 220 can include web acceleration servers and an IP gateway. The web acceleration servers can use various techniques, such as caching, compression, and pre-fetching of content, to reduce loading times for web pages and/or provide other similar features. The IP gateway can act as an intermediary to translate between different network protocols, facilitating communication between devices that use incompatible protocols. It seeks to enable seamless integration of satellite communications with the Internet by ensuring that data packets are correctly formatted and routed through the network. The gateway terminal 120 can also include an Internet local area network (LAN), which is a dedicated network segment to provide high-speed connectivity and facilitates the efficient exchange of data among the peering router, NAT, SCE, and Internet access processors 220. This internal network can help to maintain high-performance data handling and processing capabilities within the gateway terminal 120, enabling the delivery of satellite communication services with optimal efficiency and reliability.

Embodiments of the gateway terminal 120 further include an outroute clusters subsystem 230 for handling outbound communications (i.e., outroutes 250, or “outroute channels”) from the gateway terminal 120 to one or more user terminals 210 via one or more satellites of the satellite network (e.g., as shown in FIG. 1). The outroute clusters subsystem 230 can include an outroute processor block 232, a satellite gateway block 234, an outroute modulator block 236, and an outroute modulator module 238. As illustrated, satellite gateway block 234 can communicate with the IP gateway of the Internet access processors 220 via a multiplexer (MUX) LAN. The MUX LAN can enable the efficient distribution and multiplexing of data streams, allowing multiple data packets to be combined and transmitted over a single communication channel for more efficient use of network resources and bandwidth. The satellite gateway block 234 can receive incoming data from the IP gateway.

As described above, the IP gateway can act as an interface between the satellite network and the Internet, such as by performing routing, protocol translation, security, and other functions on incoming (e.g., forward-link) data. The data can be forwarded via the MUX LAN to the satellite gateway block 234, which can distribute the data to the outroute processor block 232. The outroute processor block 232 can aggregate and process outbound data traffic, preparing it for transmission over the satellite link. For example, the outroute processor block 232 can perform data packet encapsulation, compression, encryption, and/or other functions for preparing data for satellite transmission. The processed data can then flow back through the satellite gateway block 234 (e.g., acting as a logical or routing function) to the outroute modulator block 236.

The outroute modulator block 236 can convert digital data received from the satellite gateway block into a format suitable for satellite transmission, such as by modulating the digital signal into a radio frequency (RF) signal and applying specific modulation schemes that are compatible with the satellite’s transponders and the receiving capabilities of the user terminals 210. The outroute modulator block 236 can forward the modulated data to the outroute modulator module 238, which can directly interface with one or more satellites via which to send the modulated data to user terminals 210. The outroute modulator module 238 can include hardware components, such as amplifiers and antennas, for broadcasting RF signals via outroutes 250 to the satellite.

Embodiments of the gateway terminal 120 further include an inroute clusters subsystem 240 for handling inbound communications (i.e., inroutes 255, or “inroute channels”) from the one or more user terminals 210 via one or more satellites of the satellite network (e.g., as shown in FIG. 1). The inroute clusters subsystem 240 can include an inroute processor block 242, an inroute group manager (IGM) block 244, an inroute demodulator block 246, and an inroute demodulator module 248. As illustrated, the IGM block 244 can communicate with the IP gateway of the Internet access processors 220 via a redundant controller (RC) LAN. The RC LAN can provide a robust and high-availability network connection between the IGM block 244 and the IP gateway, facilitating reliable communication and data transfer.

The inroute demodulator module 248 can serve as an initial point of contact for inroute 255 communications from user terminals 210. As signals arrive from a satellite, the inroute demodulator module 248 can demodulate the RF signals into digital data, such as by reversing modulation that was applied at user terminals 210 and converting the satellite’s RF signals into a format that can be digitally processed and analyzed. Similar to the outroute modulator module 238, the inroute demodulator module 248 can include hardware, such as antennas and demodulators, for capturing and converting satellite signals for upstream processing within the gateway terminal 120.

The inroute demodulator module 248 can forward the digital data to the inroute demodulator block 246 for further initial processing. For example, the inroute demodulator block 246 can perform error checking and correction, signal quality assessment, preliminary data formatting, etc. Implementations of the inroute demodulator block 246 can help to ensure integrity of received data. The initially processed data can then be passed to the inroute processor block 242 for additional processing, which can perform various processing tasks, such as to integrate the satellite communications with Internet protocols and formats. For example, the inroute processor block 242 can perform packet reassembly, decryption, decompression, and/or other functions, depending on transformations that were applied to the data prior to transmission.

The data can then be passed to the IGM block 244, which coordinates the flow of data through the inroute clusters subsystem 240. Embodiments of the IGM block 244 manage the allocation of resources within inroute groups (or inroute clusters), including prioritizing traffic based on predefined rules and policies and helping to maintain highly efficient routing of the data (e.g., to the IP gateway for further processing and distribution, directly to internal networks for specific applications, etc.). As noted above, the IGM block 244 can communicate data with the IP gateway of the Internet access processors 220 via the RC LAN.

Embodiments described herein are concerned with inroute communications. Inroutes 255 are the pathways (channels) through which incoming signals from user terminals 210 are received by a satellite and then relayed down to the gateway terminal 120. Inroutes 255 can be organized into inroute groups (or clusters) to optimize the processing and management of incoming signals. Such grouping can be determined by several factors, including, but not limited to, geographic origins of the signals, types of data being transmitted (e.g., voice, video, Internet data), bandwidth requirements, priority levels, satellite transponder configurations, etc. As one example, one inroute group may handle traffic from densely populated urban areas, while another inroute group may handle traffic from remote locations (e.g., based on differences in traffic volume, quality of service (QoS) requirements, etc.). As another example, one inroute group may handle real-time data (e.g., voice or video calls), while another inroute group may handle less time-sensitive data (e.g., to more reliably meet QoS parameters).

The different inroute groups are managed by the IGM block 244. For example, the IGM block 244 assigns bandwidth to each inroute group, manages power levels for each inroute group, applies different modulation and coding schemes for each inroute group (e.g., to optimize link efficiency and integrity per group), etc. Managing of incoming signals as inroute groups can help to utilize satellite capacity in a more efficient manner, accounting for changes in traffic patterns, atmospheric conditions affecting signal quality, varying QoS requirements, and/or other considerations. To those ends, embodiments of the IGM block 244 can provide several features. One such feature is load balancing among inroute groups by shifting resources from less congested inroute groups to those experiencing higher traffic volumes and/or those requiring additional resources to meet associated QoS criteria. Another such feature is the capability to dynamically reconfigure inroute groups in response to changing operational needs and/or to enhance system performance, such as by adjusting the sizes of inroute groups, modifying the allocation of resources to inroute groups, redefining grouping criteria, etc. In some cases, the high-availability network connection facilitated by the RC LAN helps to ensure that the IGM block 244 reliably receives operational data, transmits control signals, and coordinates with other system components to implement management decisions effectively.

Turning to the user terminal 210 side of the architecture 200, the user terminal 210 includes a system on chip (SoC) 260 implementation of several functional blocks. The functional blocks include a downlink processor (DPP) 262, an uplink processor (UPP) 264, and a switching processor (SWP) 266. The DPP 262 receives outroute communications from the satellite. As illustrated, the DPP 262 can be considered as communicatively coupled with the outroute modulator module 238 via one or more outroutes 250. The DPP 262 can demodulate and decode signals received via the satellite downlink, such as by converting the RF signals into a digital format and processing the digital signals to retrieve the original data sent from the gateway terminal 120. The DPP 262 can also perform error correction, decryption, packet reassembly, etc.

The UPP 264 can managing inroute communications to the satellite. The UPP 262 can prepare data for transmission by, for example, performing data packet assembly, encryption, error correction coding, etc. The UPP 264 can then modulate the processed data into RF signals compatible with the satellite's uplink frequencies and specifications and/or otherwise ensure that the data is properly formatted, coded, and modulated for transmission through the satellite network to the gateway terminal 120. The SWP 266 is an intermediary between the DPP 262 and the UPP 264 (e.g., and other components of the user terminal 210).

Figure 3:
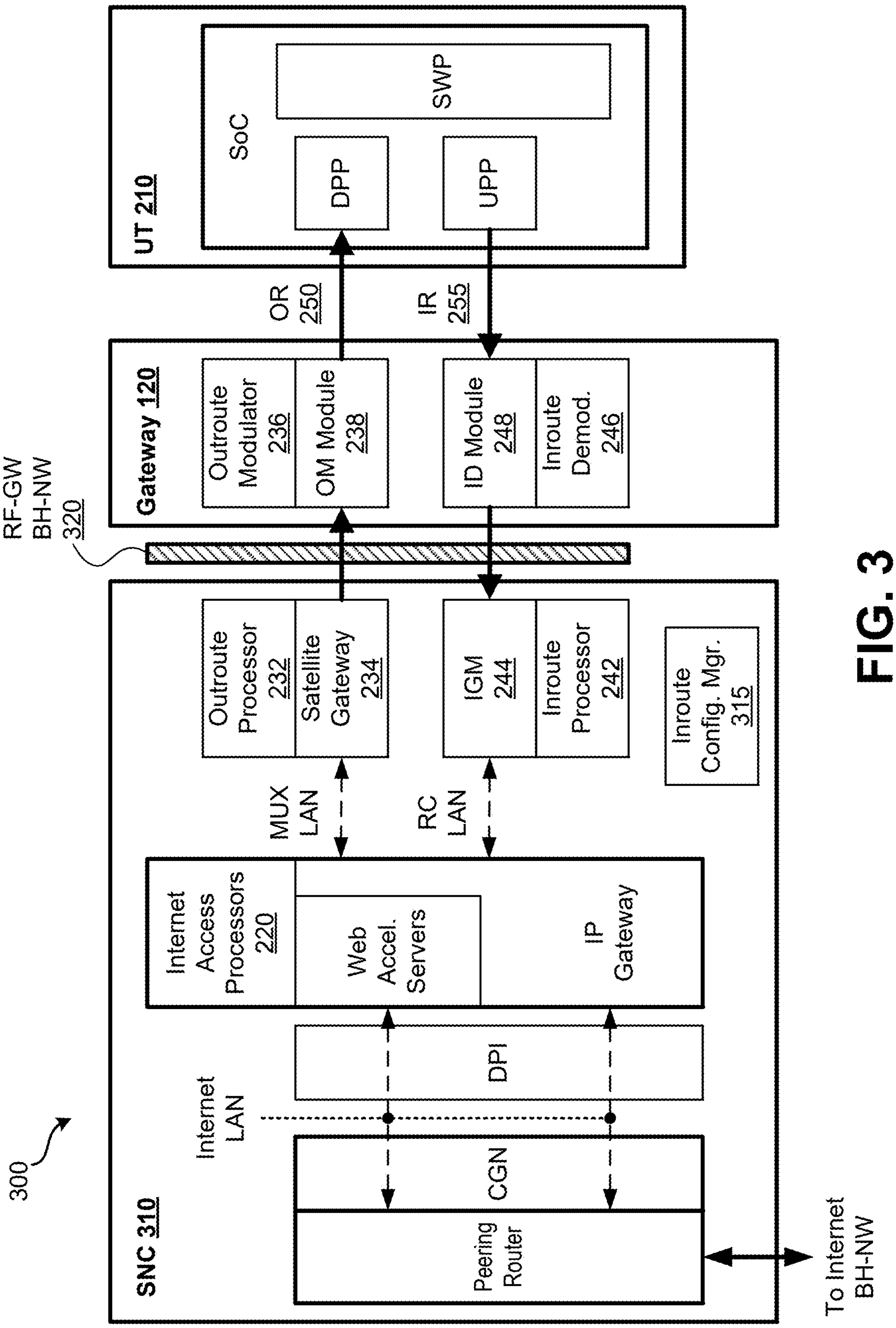
FIG. 3 shows a block diagram of another partial satellite communication system architecture that includes a gateway terminal in communication with a user terminal and a satellite network controller (SNC).

FIG. 3 shows a block diagram of another partial satellite communication system architecture 300 that includes a gateway terminal 120 in communication with a user terminal 210 and a satellite network controller (SNC) 310. The gateway terminal 120 can be an implementation of the gateway 120 of FIG. 1. The user terminal 210 is illustrated in the same manner with the same components as in FIG. 2 and can be a general representation of any suitable user-side components, such as components of the communication components 160 and/or user terminal 180 of FIG. 1 (e.g., integrated into a VSAT, or other suitable user terminal). Unlike in FIG. 2, functions for interfacing between the satellite network and the Internet are distributed between the gateway terminal 120 and the SNC 310.

The SNC 310 generally performs comprehensive management of the communication links that bridge the satellite gateway with the broader Internet infrastructure. This can involve several functions, such as prioritization of traffic (e.g., guided by predefined policies aimed at optimizing user experience and network performance), dynamic allocation of network resources (e.g., bandwidth), upholding network security, and certain satellite link optimization (e.g., by adjusting power levels, modulation schemes, error correction techniques, etc.). In some implementations, the SNC 310 helps to coordinate activities across network elements, such as satellites, ground stations, and user terminals.

In the illustrated implementation, the SNC 310 includes the peering router, NAT unit, SCE, and Internet access processors 220 described with reference to FIG. 2. The illustrated SNC 310 also includes the outroute processor block 232 and the satellite gateway block 234 described as part of the outroute clusters subsystem 230 of FIG. 2, the inroute processor block 242 and the IGM block 244 described as part of the inroute clusters subsystem 240 of FIG. 2, the MUX LAN, and the RC LAN. The SNC 310 can also include an inroute configuration manager 315. The inroute configuration manager 315 generally oversees the configuration and management of inbound communication links (inroutes 255), including functions relating to optimizing efficiency, reliability, and QoS. For example, the inroute configuration manager 315 can set and tune operational parameters, such as modulation schemes, forward error correction (FEC) rates, power levels, bandwidth allocations, etc. The inroute configuration manager 315 can also dynamically allocate bandwidth, power and/or other network resources among different inroutes 255 based on current network conditions and demand.

In the illustrated architecture 300, the gateway terminal 120 can be implemented as an RF gateway in communication with the SNC 310 via an RF gateway backhaul network (RF-GW BH-NW) 320. For example, multiple RF gateways can communicate with the Internet backbone by communicating through a shared SNC 310 via the RF-GW BH-NW 320. Such an architecture 300 can help to centralize certain gateway functions and reduce the complexity of individual gateway deployments. As illustrated, each gateway terminal 120 may only include the portions of the gateway functionality that directly interface with the satellite(s): the outroute modulator block 236 and outroute modulator module 238 on the outroute 250 side, and the inroute demodulator block 246 and inroute demodulator module 248 on the inroute 255 side.

Thus, in architectures like the one of FIG. 3, some gateway functions are more centralized in one or more SNCs 310, and other gateway functions are more decentralized in a larger number of RF gateways. As such, references to a "gateway," "gateway system," or the like, can generally refer to all the gateway functions associated with signal paths through a particular RF gateway, which may also include certain shared components disposed in an associated SNC 310. Accordingly, an IGM block 244, or other component, can be considered as implemented by, disposed in, or otherwise associated with a particular gateway or gateway system, even when it is implemented as part of the SNC 310.

As noted above, embodiments are directed to inroutes 255 and inroute groups. Overall management of inroutes 255 involves collaboration between the inroute configuration manager 315 and the IGM block 244. The inroute configuration manager 315 has a more micro-level focus on configurations and technical parameters governing individual inroutes 255, while the IGM block 244 has a more macro-level focus on the inroutes 255 as grouped (or clustered). For example, the inroute configuration manager 315 may try to allocate sufficient bandwidth to a particular inroute 255 to maintain a desired QoS, and the IGM block 244 may seek to group inroutes 255 with similar QoS requirements to help optimize overall network bandwidth allocations.

Figure 4:
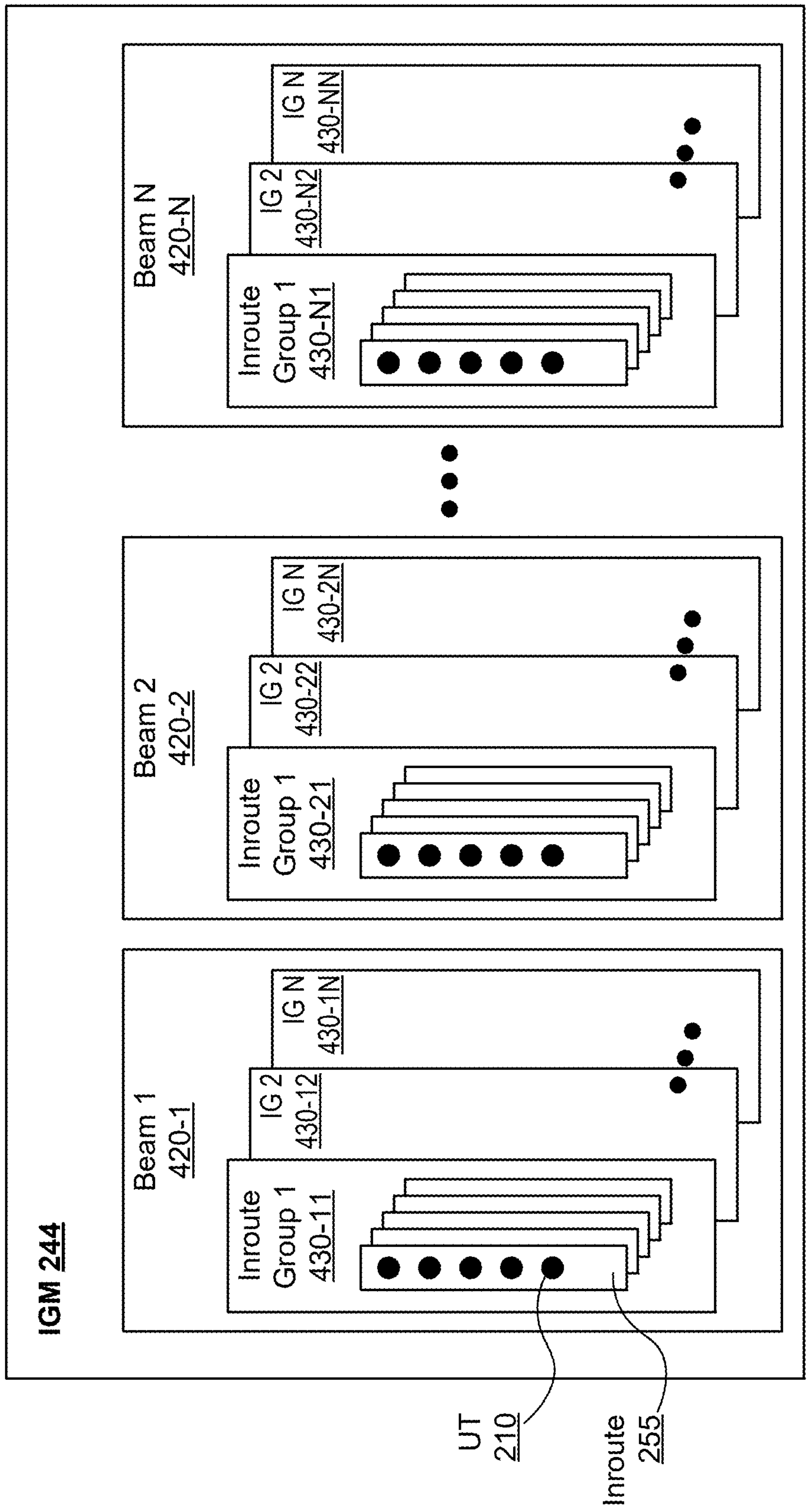
FIG. 4 shows an illustrative representation of inroute handling in an inroute group management (IGM) block.

FIG. 4 shows an illustrative representation of inroute handling in an IGM block 244. As illustrated, there are multiple beams 420 (i.e., it is a multi-spot beam satellite system) and multiple inroute groups 430. Each inroute group 430 includes a set of (i.e., one or more) inroutes 255. As described herein, embodiments assume that the satellite communication system uses time division multiple access (TDMA) techniques to support concurrent communications with large numbers of user terminals (UTs) 210. In such systems, each inroute 255 corresponds to a channel that can be shared by multiple of the UTs 210. For example, a particular inroute 255 can be a channel that is accessed by multiple VSATs in their corresponding time slots.

Although each beam 420 is illustrated as supporting N inroute groups 430, the inroute groups 430 supported by each beam 420 and/or the number of inroute groups 430 supported by each beam 420 can be different. In some implementations, each beam 420 can handle traffic for all inroute groups 430. For example, the inroute groups 430 can be defined by service type, priority level, or other non-geographic criteria. By having support for all inroute groups 430 in all beams 420, any user within the coverage area of any beam 420 could potentially access the full range of services offered by the system (i.e., by any inroute group 430), regardless of location. In other implementations, different beams 420 support different subsets of inroute groups 430. For instance, inroute groups 430 can be geographically oriented, tailored to specific regional needs or conditions, etc. As one example, certain inroute groups 430 can be dedicated to regions with higher traffic demand or specific QoS requirements, and only the beams covering those regions support those inroute groups 430. In some implementations, multiple beams 420 can support some of the same inroute groups 430. For example, an inroute group 430 defined by a common service type or QoS requirement can apply to users in multiple geographic areas, and all beams 420 covering those users can be configured to support that inroute group 430.

Embodiments described herein seek to address and mitigate impacts of high burst error rates within inroutes 255 of a satellite communication system. Such a system can experience various factors contributing to high stream error rates, including physical layer hardware failures, external interference affecting inroute 255 transmission frequencies, and poor link conditions. These factors result in immediate consequences, such as capacity loss and reduced bandwidth utilization, which can tend to result in terminals retransmitting data in response to erroneous bursts. Embodiments target high burst error rates arising from physical channel failures or external interference (e.g., from a nearby cell tower, etc.). Such cases can result either in missing inroute transmissions at the gateway terminal, or in the gateway terminal failing to correctly demodulate and decode a received inroute signal because of excessive interference. Embodiments empower the IGM block 244 to identify impacted inroutes and to cease the allocation of resources (e.g., bandwidth) to these impacted inroutes.

Figure 5:
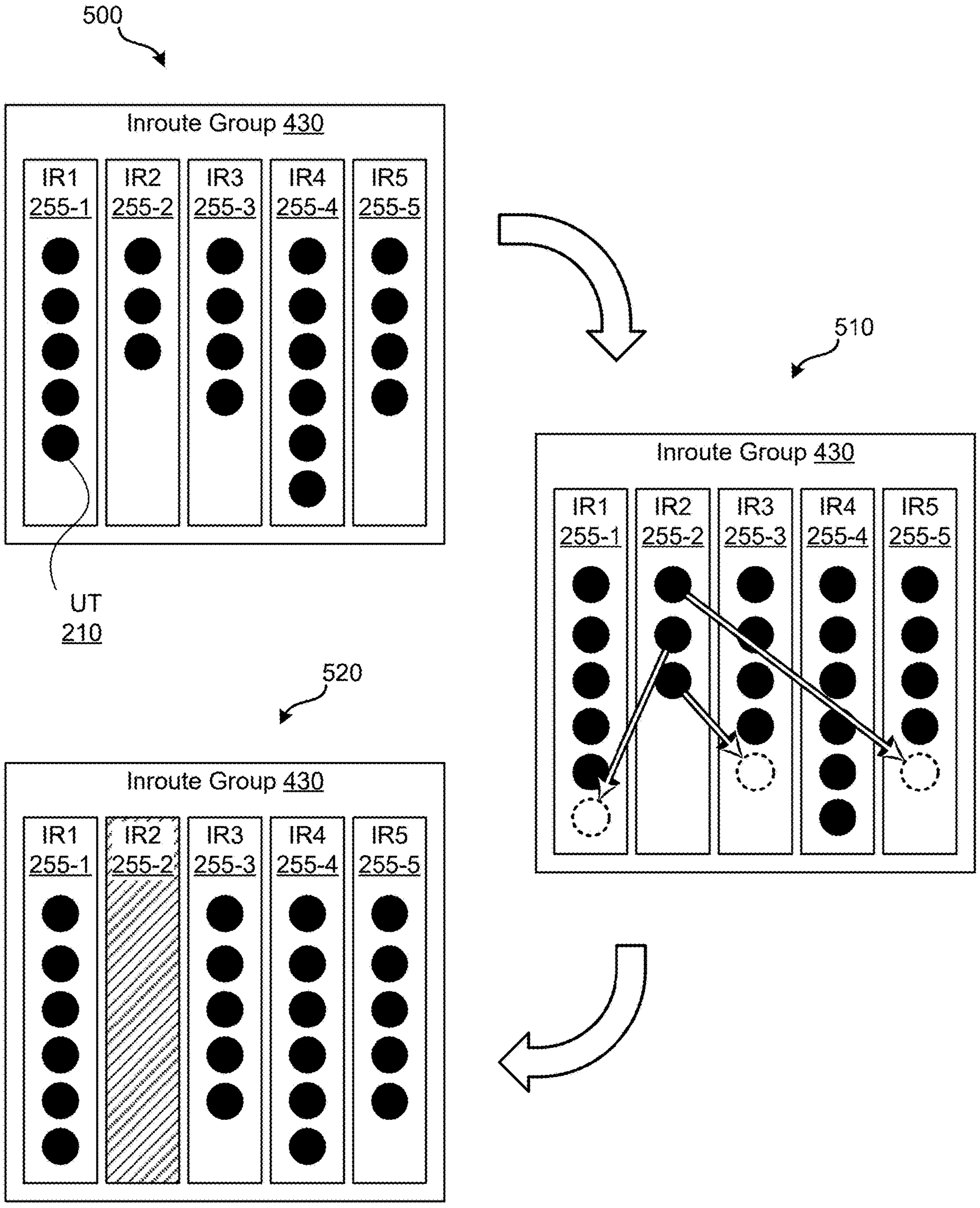
FIG. 5 shows a simplified flow representation of detection and reallocation of user terminals (UTs) in an inroute group over a sequence of times.

For example, FIG. 5 shows a simplified flow representation of detection and reallocation of user terminals (UTs) 210 in an inroute group 430 over a sequence of times. At some initial time 500, the illustrated inroute group 430 has five inroutes (IR) 255. Each inroute 255 is illustrated as concurrently supporting traffic for multiple UTs 210. In particular, at the initial time 500, a first inroute 255-1 is supporting five UTs, a second inroute 255-2 is supporting three UTs, a third inroute 255-3 is supporting four UTs, a fourth inroute 255-4 is supporting six UTs, and a fifth inroute 255-5 is supporting four UTs. It is assumed that the second inroute 255-2 is detected to be a "bad" inroute 255, meaning that traffic from that inroute is exhibiting high burst error rates.

Subsequently, at time 510, a determination is made that the first inroute 255-1, the third inroute 255-3, and the fifth inroute 255-5 of the inroute group 430 have excess capacity to support the affected UTs 210 (i.e., those UTs 210 presently on the bad second inroute 255-2). Subsequently, at time 520, the affected UTs 210 are moved to other inroutes 255 of the inroute group 430, and the bad second inroute 255-2 is disabled (e.g., temporarily). Disabling the bad second inroute 255-2 can effectively improve the inroute group 430 reception quality at the gateway terminal, while also reducing retransmissions and other results of having a bad inroute 255 in the inroute group 430.

In connection with contexts described herein, embodiments seek to provide several features. One feature is automatic identification of bad inroutes 255, such as by develop the capability to discern those inroutes 255 exhibiting a high burst error rate (e.g., surpassing a predefined threshold). Another feature is automatic UT 210 migration from bad inroutes 255, such as by relocating those UTs 210 to other inroutes 255 of the inroute group 430. Another feature is automatic exclusion of identified bad inroutes 255 from load balancing, bandwidth calculations, network optimizations, and/or other algorithms. Another feature is automatic recovery of bad inroutes 255 which have subsequently become "restored," such as by identifying when the burst error rate of a previously identified bad inroute 255 has dropped below the predefined threshold. Another feature is automatic generation of an alarm or other operator notification in scenarios where high burst error rates are impacting inroutes 255.

Figure 6:
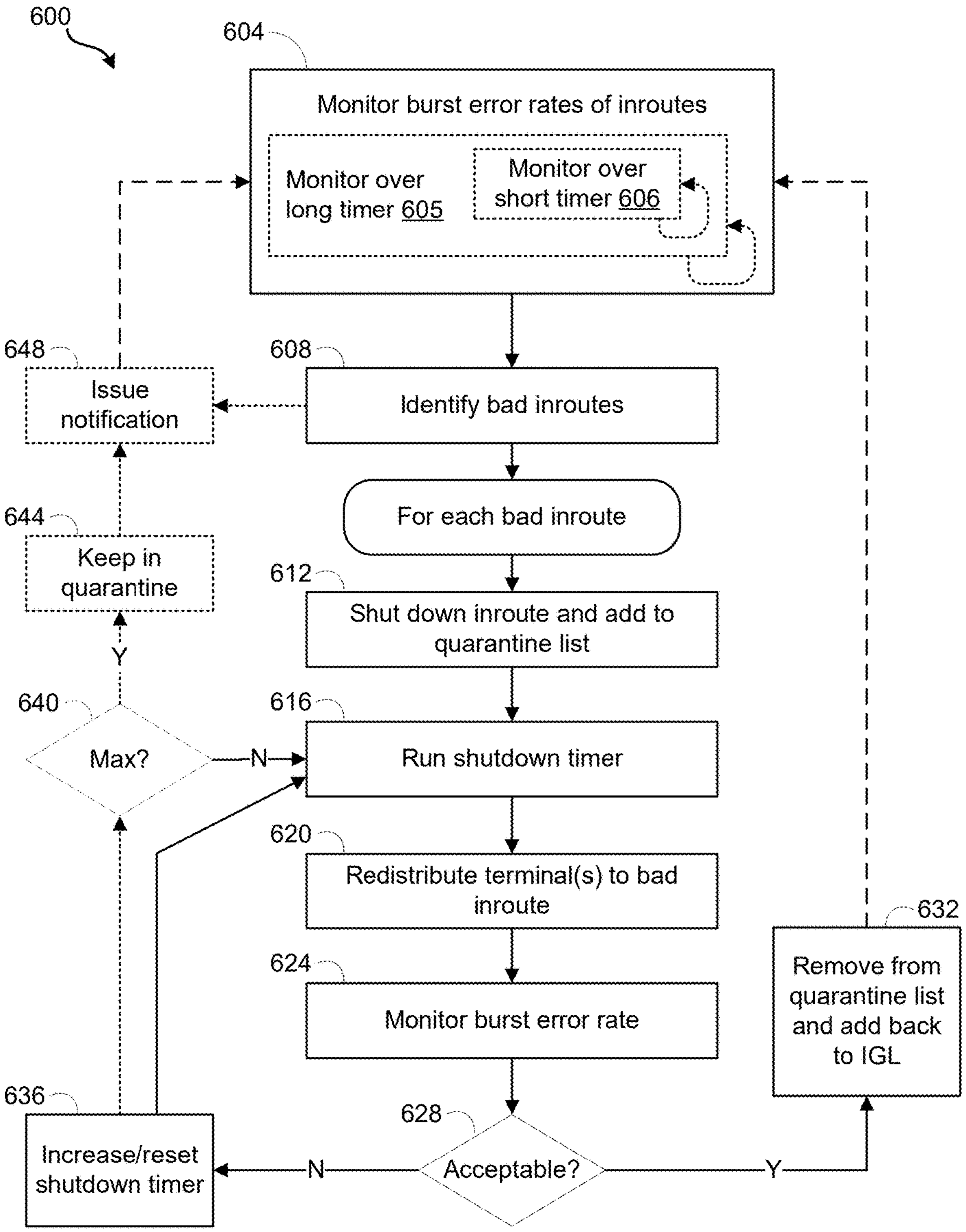
FIG. 6 shows a flow diagram of an illustrative method for automatic inroute shedding in a satellite communication system, according to embodiments described herein.

FIG. 6 shows a flow diagram of an illustrative method 600 for automatic inroute shedding in a satellite communication system, according to embodiments described herein. Embodiments of the method 600 are implemented by components of a gateway system, such as an inroute group management (IGM) block. As described above, the IGM block can be part of a gateway system by being implemented in a gateway terminal, a satellite network controller (SNC), or any feasible portion of a gateway inroute signal path.

Embodiments of the method 600 begin at stage 604 by monitoring monitor-time burst error rates of inroutes of the satellite communication system. A particular gateway (or a particular IGM block) can receive inroutes from multiple (e.g., large numbers of) user terminals, and the monitoring at stage 604 can involve monitoring all of those inroutes. In some cases, the monitoring involves detecting the rate of cyclic redundancy check (CRC) errors within the satellite inroutes. CRC errors occur when there is a mismatch between an expected checksum and a calculated checksum of received data in satellite communications. This discrepancy can indicate that the data has been altered or corrupted during transmission, thereby compromising data integrity. CRC methodologies typically use a specific polynomial division on the data's binary representation, generating a checksum that is attached to the data prior to transmission by the user terminal (e.g., by a VSAT). Upon reception at a gateway, the receiver recalculates the checksum using the same polynomial. If the newly calculated checksum fails to match the transmitted one, a CRC error can be flagged.

In some cases, the monitoring at stage 604 can additionally or alternatively include monitoring for "missing burst errors." Missing burst errors refer herein to an anomaly where data expected in a predefined time slot (e.g., in TDMA communications) is not received by the gateway. Both CRC errors and missing burst errors can be caused by a range of technical malfunctions, environmental factors, and/or other causes. One such cause is signal obstruction or degradation, where physical barriers or atmospheric conditions (e.g., rain fade, solar radiation, etc.) attenuate the signal strength, which can alter signal bits in a burst and/or preventing the burst from reaching the receiver. Another such cause is interference, such as interference from devices operating in adjacent channels or the same channel, or internal interference within the TDMA system itself (e.g., crosstalk between channels), which can corrupt the transmitted inroute signal. Another such cause is hardware malfunctions in the satellite or ground station equipment, such as issues in amplifiers, transponders, or antennas, which can introduce errors into the data. Another such cause is Doppler shift resulting from relative motion between satellites and ground stations, which can change the frequency of the received signal and lead to errors, if not adequately compensated. Another such cause is synchronization failure. For example, TDMA systems can rely on precise timing for proper alignment of transmissions within assigned time slots; timing inaccuracies can result from clock drifts in the satellite or ground equipment, leading to misalignment of the data bursts with their intended slots.

In some embodiments, the monitoring at stage 604 involves monitoring over a predefined long time period (i.e., at least one minute) at stage 605. In some embodiments, the monitoring at stage 604 can involve monitoring over a predefined short time period (i.e., less than 30 seconds) at stage 606. In some embodiments, the monitoring at stage 604 can involve monitoring over both the predefined long time period at stage 605 and at the predefined short time period at stage 606. Each of the long time period and the short time period can be set and/or defined by a countdown timer, clock, or any suitable component. In one implementation, the long time period is two minutes, and the short time period is five seconds. In some implementations, the long time period is at least 10 times the duration of the short time period. Embodiments can monitor concurrently over both the predefined long time period at stage 605 and at the predefined short time period at stage 606. For example, multiple iterations of the short time period occur during each iteration of the long time period. Embodiments can obtain burst error rates (e.g., CRC error and/or missed burst error rates) for either or both of the long time period and the short time period.

At stage 608, embodiments can identify (based on the monitoring in stage 604) a set of "bad" inroutes. As used herein, a bad inroute is one of the inroutes determined at least to have a burst error rate exceeding a predetermined threshold. In some implementations, any inroute with a burst error rate exceeding the predetermined threshold is identified as a bad inroute. Other implementations consider burst error rates determined in stages 605 and 606 for both of the long time period and the short time period to determine whether the two time periods, taken together, suggest a consistent (i.e., persistent) problem with the inroute. For example, in such implementations, an inroute is only considered to be a bad inroute if the burst error rates determined in stages 605 and 606 converge to a similar value that exceeds the predetermined threshold.

In some implementations, the identifying at stage 608 includes comparing the burst error rate of a potentially bad inroute against the burst error rates of other inroutes in the same inroute group. In such implementations, the inroute is only considered a bad inroute if its burst error rate is inconsistent with the burst error rates of other inroutes in its inroute group. For example, if all inroutes in a same inroute group (e.g., where the inroutes are grouped according to geography) exhibit a similar increase in burst error rate, that might suggest a macro-level concern, such as weather-related degradation; which is not the type of inroute-level error that may be of concern to the method 600. Similarly, in some implementations, the identifying at stage 608 includes detecting whether there is an overall reduction in receive power at the gateway to an extent that suggests a macro-level concern, such as weather-related degradation over an entire beam. In such implementations, the inroute is only considered a bad inroute if the increase in its burst error rate is not also concurrent with a significant reduction in receive power at the gateway.

In some embodiments, the method 600 continues with subsequent stages for each bad inroute of the set of bad inroutes as identified in stage 608. For example, those stages can be performed in parallel and/or in series for each of the identified bad inroutes. At stage 612, embodiments can shut down the bad inroute. At the time of performing stage 612, each inroute supports communications from a corresponding subset of user terminals (e.g., VSATs) in the satellite communication network, such that the bad inroute is presently supporting communications from an "impacted" set of user terminals (i.e., the subset of user terminals impacted by burst error-related degradation on the bad inroute). Shutting down the bad inroute at stage 612 can include migrating the impacted set of user terminals from the bad inroute to one or more others of the inroutes that are not part of the set of bad inroutes. For example, the impacted set of user terminals is migrated to another inroute in the same inroute group as the bad inroute. Shutting down the bad inroute at stage 612 can further include quarantining the bad inroute. For example, the bad inroute is added to an inroute quarantine list.

In some embodiments, user terminals can select and/or be assigned to inroutes based on a published list of available inroutes in available inroute groups, referred to herein as an inroute group list (IGL). For example, a user terminal can be associated with a particular geography, guaranteed QoS, etc., which corresponds to one or more inroute groups; and inroutes in the one or more inroute groups can be published to the user terminal as available for use as a channel for inroute communications. Shutting down the bad inroute at stage 612 can further include removing the bad inroute from the IGL.

At stage 616, embodiments wait for a predefined shutdown time. For example, the shutdown time is defined by setting a countdown timer, or any other suitable component, to run until the predefined shutdown time elapses. In one implementation, the predefined shutdown time is five minutes. In another implementation, the predefined shutdown time is the same as the long time period used in stage 605.

Subsequent to elapsing of the predefined shutdown time in stage 616, embodiments can test the bad inroute at stages 620 and 624. At stage 620, embodiments can redistribute a selected user terminal (e.g., or a small number of user terminals) temporarily to the bad inroute. In some implementations, the redistributing at stage 620 includes selecting the user terminal(s). In one implementation, the user terminal(s) is selected randomly (e.g., any user terminal from any inroute of the same inroute group can be randomly selected). In another implementation, the user terminal(s) is selected based by identifying one or more user terminals presently exhibiting a low error rate and/or low loading (i.e., carrying a relatively small amount of traffic), such that a potential temporary degradation in the user terminal(s) performance will be acceptable to the overall performance of the user terminal(s).

At stage 624, embodiments can monitor a test-time burst error rate of the bad inroute based on communications from the redistributed user terminal(s). In some embodiments, the monitoring at stage 624 is the same as the monitoring at stage 604 (e.g., including the monitoring at stages 605 and/or 606). In other embodiments, the monitoring at stage 624 is the same as the short time period monitoring at stage 606. In other embodiments, the monitoring at stage 624 uses an even smaller time period, such as a two-second time period. Notably, with only one terminal (or a small number of terminals) relocated to the bad inroute, the gateway (e.g., IGM block) can allocate sufficient bandwidth more frequently.

At stage 628, embodiments can determine (based on the testing at stages 620 and 624) whether the test-time burst error rate of the bad inroute no longer exceeds the predetermined threshold (i.e., whether the burst error rate has returned to an acceptable level). If so, at stage 632, embodiments can restore the inroute previously identified as a bad inroute. The restoring at stage 632 can include removing the bad inroute from quarantine, such as by removing the restored inroute from the inroute quarantine list and/or re-adding the restored inroute to the IGL.

If it is determined at stage 628 that the test-time burst error rate of the bad inroute still exceeds the predetermined threshold (i.e., it is still not acceptable), embodiments can reset and/or increase the shutdown timer at stage 636 and can return to stage 616 for another iteration. In one implementation, this involves resetting the shutdown timer at stage 636 and letting the shutdown time elapse again at stage 616 prior to retesting the inroute again. In another implementation, this involves increasing the shutdown time at stage 636 and letting the longer shutdown time elapse again at stage 616 prior to retesting the inroute again.

In some embodiments, at stage 640, a determination is made as to whether an iteration criterion has been maxed out, and another testing iteration (e.g., at least of stages 612-628) is performed only if the iteration criterion is not maxed out. Some such implementations assume that the shutdown time is increased at stage 636, and the determination at stage 640 is whether the shutdown time has reached or exceeded a predetermined maximum shutdown time. Other such implementations increase an iteration counter in each iteration, and the determination at stage 640 is whether the iteration counter has reached or exceeded a predetermined maximum iteration count. Other iterations look at both the iteration count and the shutdown time and only allow further testing iterations if neither criteria has maxed out.

In some embodiments that include stage 640, when the iteration criterion has been maxed out, the bad inroute is moved to a persistent quarantine state at stage 644. For example, the bad inroute is moved into a higher-level of quarantine (e.g., off of the inroute quarantine list, or specially flagged). In some implementations, inroutes in the higher-level of quarantine are flagged for physical repair, manual intervention, and/or other different treatment. In some embodiments, at stage 648, an operator notification is issued to indicate that the inroute has been moved to the persistent quarantine state. The operation notification can include any suitable notification, such as a visual indication, an audible indication, an update to a graphical user interface, etc. In some embodiments, the operator notification is issued at stage 648 upon first detecting the bad inroute at stage 608. For example, the bad inroute can be visually flagged in an operator interface at stage 648 upon identification at stage 608; a status can be updated at stage 648 as the bad inroute is tested, retested, etc.; the interface can be updated at stage 648 to indicate that the inroute was restored in the event that the inroute is determined to be acceptable at stage 628; the bad inroute can be more urgently flagged in the interface at stage 648 in the event that it is moved to the persistent quarantine state at stage 644; etc.

Figure 7:
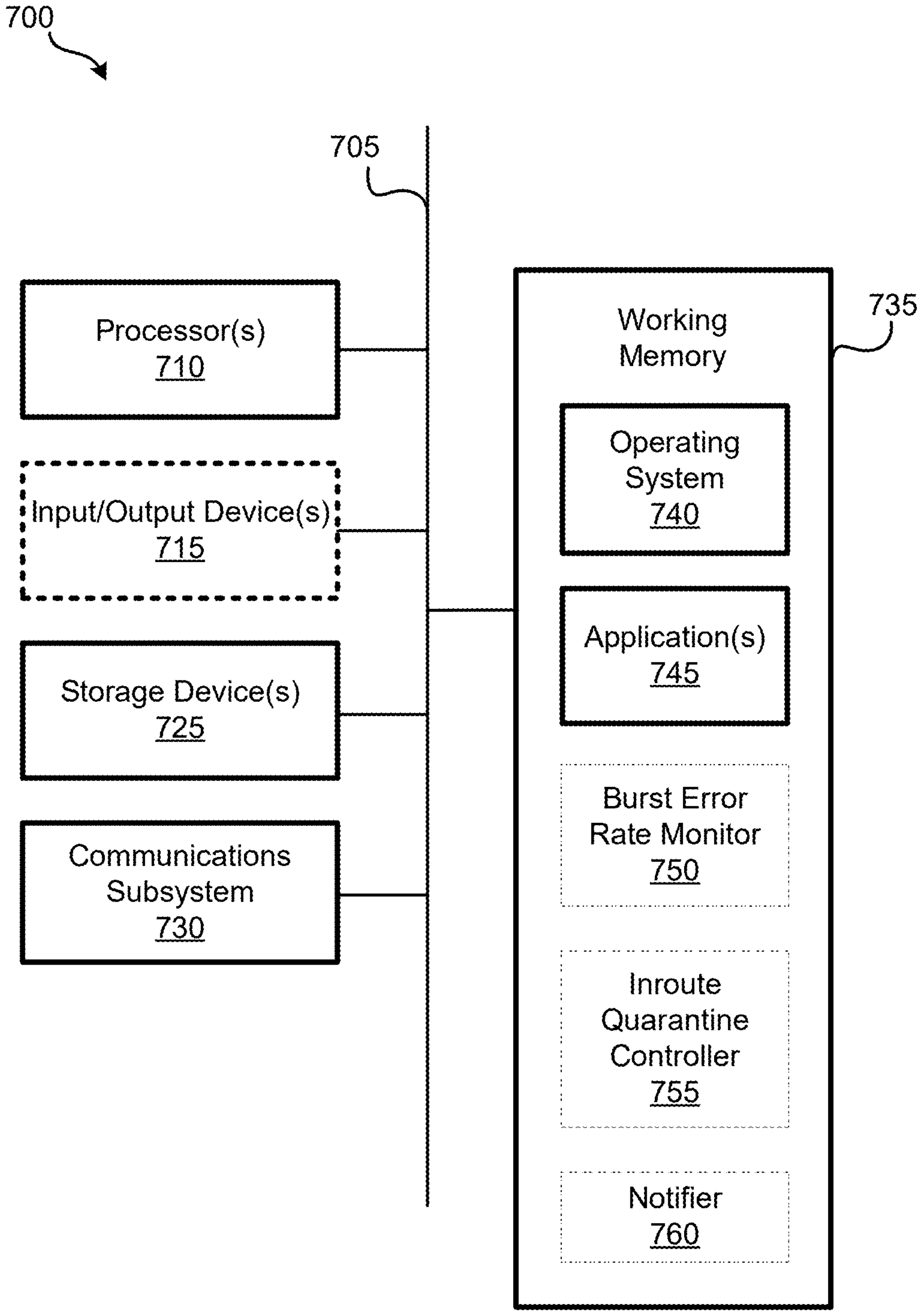
FIG. 7 provides a schematic illustration of an embodiment of a computational system that can implement various system components and/or perform various steps of methods provided by various embodiments.

In some embodiments, components of the gateway (e.g., of the IGM block) are implemented in a computational environment. FIG. 7 provides a schematic illustration of an embodiment of a computational system 700 that can implement various system components and/or perform various steps of methods provided by various embodiments. The computational system 700 represents an illustrative implementation of an IGM block having intelligent inroute shedding features described herein. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computational system 700 is shown including hardware elements that can be electrically coupled via a bus 705 (or may otherwise be in communication, as appropriate). The hardware elements may include one or more processors 710, including, without limitation, a set of (i.e., one or more)

general-purpose processors and/or special-purpose processors (such as digital signal processing chips, graphics acceleration processors, video decoders, and/or the like). As described herein, the IGM block is integrated in a gateway. In some implementations, one or more of the processor(s) 710 are processor(s) of the gateway that can also be utilized by the IGM block.

Optionally, embodiments of the computational system 700 can include one or more input/output (I/O) devices 715. The I/O devices 715 can include user input devices (e.g., a mouse, a keyboard, remote control, touchscreen interfaces, audio interfaces, video interfaces, and/or the like), machine input devices (e.g., computer-to-computer interfaces, such as wired and/or wireless input data ports), user output devices (e.g., display devices, printers, and/or the like), and/or machine input devices (e.g., computer-to-computer interfaces, such as wired and/or wireless output data ports). In some implementations, some or all of the I/O devices 715 are I/O devices of the gateway that can also be utilized by the IGM block.

The computational system 700 may further include (and/or be in communication with) one or more non-transitory storage devices 725, which can comprise, without limitation, local and/or network accessible storage, and/or can include, without limitation, a disk drive, a drive array, an optical storage device, a solid-state storage device, such as a random-access memory ("RAM"), and/or a read-only memory ("ROM"), which can be programmable, flash-updateable and/or the like. Such storage devices may be configured to implement any appropriate data stores, including, without limitation, various file systems, database structures, and/or the like. In some embodiments, the storage devices 725 include memory for storing timer durations, thresholds, and/or other information used by embodiments to implement features described herein. In some implementations, some or all of the storage devices 725 are storage devices of the gateway that can also be utilized by the IGM block.

The computational system 700 can also include a communications subsystem 730, which can include, without limitation, a modem, a network card (wireless or wired), an infrared communication device, a wireless communication device, and/or a chipset (such as a Bluetooth™ device, another 802.11 device, a WiMax device, cellular communication device, etc.), and/or the like. As described herein, embodiments of the communications subsystem 730 can include components for communicating with an IP gateway via an RC LAN, for communicating with other blocks of an inroute clusters subsystem, for communicating with an inroute demodulator block via an RF gateway backhaul network, etc. In some implementations, the communications subsystem 730 utilizes and/or includes one or more other components of the gateway.

Embodiments of the computational system 700 can further include a working memory 735, which can include a RAM or ROM device, as described herein. The computational system 700 also can include software elements, shown as currently being located within the working memory 735, including an operating system 740, device drivers, executable libraries, and/or other code, such as one or more application programs 745, which may include computer programs provided by various embodiments, and/or may be designed to implement methods, and/or configure systems, provided by other embodiments, as described herein. Merely by way of example, one or more procedures described with respect to the method(s) discussed herein can be implemented as code and/or instructions executable by a computer (and/or a processor within a computer); in an aspect, then, such code and/or instructions can be used to configure and/or adapt a general-purpose computer (or other device) to perform one or more operations in accordance with the described methods. In some implementations, the computational system 700 of the IGM block can utilize and/or include one or more computational components (e.g., working memory, etc.) of the gateway.

In some embodiments, the operating system 740 and the working memory 735 are used in conjunction with the one or more processors 710 to implement a burst error rate monitor 750, an inroute quarantine controller 755, and a notifier 760. For example, the burst error rate monitor 750 monitors monitor-time burst error rates of inroutes and identifies (based on the monitoring) bad inroutes as those of the plurality of inroutes that have burst error rates exceeding a predetermined threshold. For each bad inroute of the set of bad inroutes, the inroute quarantine controller 755 can perform various features. For example, the inroute quarantine controller 755 can shut down the bad inroute by migrating an impacted set of user terminals from the bad inroute to one or more other inroutes that are not part of the set of bad inroutes, and by quarantining the bad inroute. The inroute quarantine controller 755 can further (e.g., iteratively) retest the bad inroute. For example, in each of one or more retesting iterations, the inroute quarantine controller 755 can wait for elapsing of a predefined shutdown time, redistributing one or more selected user terminals to the bad inroute, and direct the burst error rate monitor 750 to monitor a test-time burst error rate of the bad inroute to determine whether the test-time burst error rate of the bad inroute no longer exceeds the predetermined threshold. If the inroute is determined to have returned to an acceptable burst error rate, embodiments of the inroute quarantine controller 755 can restore the bad inroute, including removing the bad inroute from quarantine. If the inroute is determined to still have an unacceptable burst error rate, embodiments of the inroute quarantine controller 755 can either continue to retest the inroute, place the inroute in a higher level of quarantine, or take other actions. In some embodiments, the notifier 760 can issue operator notifications at suitable times, such as upon detection of bad inroutes, upon placing the inroute in a higher level of quarantine, etc.

A set of these instructions and/or codes can be stored on a non-transitory (or non-transient) computer-readable storage medium, such as the non-transitory storage device(s) 725 described above. In some cases, the storage medium can be incorporated within a computer system, such as computational system 700. In other embodiments, the storage medium can be separate from a computer system (e.g., a removable medium, such as a compact disc), and/or provided in an installation package, such that the storage medium can be used to program, configure, and/or adapt a general-purpose computer with the instructions/code stored thereon. These instructions can take the form of executable code, which is executable by the computational system 700 and/or can take the form of source and/or installable code, which, upon compilation and/or installation on the computational system 700 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware can also be used, and/or particular elements can be implemented in hardware, software (including portable software, such as applets, etc.), or both. Further, connection to other computing devices, such as network input/output devices, may be employed.

As mentioned above, in one aspect, some embodiments may employ a computer system (such as the computational system 700) to perform methods in accordance with various embodiments of the invention. According to a set of embodiments, some or all of the procedures of such methods are performed by the computational system 700 in response to processor 710 executing one or more sequences of one or more instructions (which can be incorporated into the operating system 740 and/or other code, such as an application program 745) contained in the working memory 735. Such instructions may be read into the working memory 735 from another computer-readable medium, such as one or more of the non-transitory storage device(s) 725. Merely by way of example, execution of the sequences of instructions contained in the working memory 735 can cause the processor (s) 710 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computational system 700, various computer-readable media can be involved in providing instructions/code to processor(s) 710 for execution and/or can be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 725. Volatile media include, without limitation, dynamic memory, such as the working memory 735. Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 710 for execution. Merely by way of example, the instructions may initially be carried on a disk of a remote computer. The remote computer can load the instructions into its dynamic memory and send the instructions as signals over a transmission medium to be received and/or executed by the computational system 700. The communications subsystem 730 (and/or components thereof) generally will receive signals, and the bus 705 then can carry the signals (and/or the data, instructions, etc., carried by the signals) to the working memory 735, from which the processor(s) 710 retrieves and executes the instructions. The instructions received by the working memory 735 may optionally be stored on a non-transitory storage device 725 either before or after execution by the processor(s) 710.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for automatic inroute shedding in a satellite communication system, the method comprising:

monitoring monitor-time burst error rates of a plurality of inroutes of the satellite communication system;

identifying, based on the monitoring, a set of bad inroutes as those of the plurality of inroutes that have burst error rates exceeding a predetermined threshold; and for each bad inroute of the set of bad inroutes:

shutting down the bad inroute by migrating an impacted set of user terminals from the bad inroute to one or more others of the plurality of inroutes that are not part of the set of bad inroutes, and quarantining the bad inroute, wherein the impacted set of user terminals is a subset of a plurality of user terminals of the satellite communication system that is serviced by the bad inroute;

testing the bad inroute, subsequent to elapsing of a predefined shutdown time, by redistributing a selected user terminal to the bad inroute and monitoring a test-time burst error rate of the bad inroute;

determining, based on the testing, that the test-time burst error rate of the bad inroute no longer exceeds the predetermined threshold; and restoring the bad inroute, based on the determining, by removing the bad inroute from quarantine.

2. The method of claim 1, further comprising:

generating and outputting one or more operator notifications responsive to and based on the identifying.

3. The method of claim 1, wherein the determining comprises:

determining, based on the testing, whether the test-time burst error rate of the bad inroute no longer exceeds the predetermined threshold; and responsive to determining that the test-time burst error rate of the bad inroute still exceeds the predetermined threshold, migrating the selected user terminal away from the bad inroute and repeating the testing step and the determining step, wherein the restoring the bad inroute is performed only in response to the determining that the test-time burst error rate of the bad inroute no longer exceeds the predetermined threshold.

4. The method of claim 3, wherein the repeating comprises increasing the predefined shutdown time so that repeating of the testing step is subsequent to elapsing of a larger amount of time.

5. The method of claim 4, wherein the repeating further comprises:

detecting, subsequent to the increasing the predefined shutdown time and prior to repeating the testing step and the determining step, whether a predefined iteration threshold has been reached; and adding the bad inroute to a persistent quarantine list responsive to detecting that the predefined iteration threshold has been reached, wherein the testing step and the determining step are repeated only responsive to detecting that the predefined iteration threshold has not been reached.

6. The method of claim 1, wherein the testing comprises selecting the selected user terminal to redistribute to the bad inroute based on determining that traffic from the selected user terminal presently exhibits a low data error rate and/or that the selected user terminal is presently carrying a low traffic level.

7. The method of claim 1, wherein:

the monitoring the monitor-time burst error rates comprises:

monitoring one or more long-term burst error rates over a timeframe associated with the monitor-time, each long-term burst error rate representing a prevalence of burst errors detected during elapsing of a long timer; and monitoring a plurality of short-term burst error rates over the timeframe associated with the monitor-time, each short-term burst error rate representing a prevalence of burst errors detected during elapsing of a short timer, wherein each iteration of the long timer encompasses a plurality of iterations of the short timer; and the identifying comprises identifying the set of bad inroutes as those of the plurality of inroutes that have burst error rates exceeding a predetermined threshold according to both the long-term burst error rates and the short-term burst error rates.

8. The method of claim 1, wherein:

each of the plurality of inroutes is part of one of a plurality of inroute groups, such that each bad inroute is part of a corresponding inroute group; and the migrating the impacted set of user terminals is from the bad inroute to one or more others of the plurality of inroutes that are not part of the set of bad inroutes and are part of the corresponding inroute group.

9. The method of claim 8, wherein the identifying comprises:

comparing the burst error rate of the bad inroute to burst error rates of other inroutes in the corresponding inroute group; and identifying the set of bad inroutes as those of the plurality of inroutes that have burst error rates exceeding a predetermined threshold relative to the burst error rates of other inroutes in the corresponding inroute group.

10. The method of claim 1, wherein:

the quarantining the bad inroute comprises adding the bad inroute to an inroute quarantine list and removing the bad inroute from an inroute group list; and the restoring the bad inroute comprises removing the bad inroute from the inroute quarantine list and adding the bad inroute back to the inroute group list.

11. The method of claim 1, wherein the monitoring the monitor-time burst error rates of the plurality of inroutes comprises determining a prevalence of cyclic redundancy check (CRC) code errors and/or missed transmission errors.

12. An inroute group manager (IGM) of a ground network of a satellite communication system, the IGM comprising:

a set of processors; and a non-transitory memory having processor-readable instructions stored thereon, which, when executed, cause the set of processors to perform steps comprising:

monitoring monitor-time burst error rates of a plurality of inroutes;

identifying, based on the monitoring, a set of bad inroutes as those of the plurality of inroutes that have burst error rates exceeding a predetermined threshold; and for each bad inroute of the set of bad inroutes:

shutting down the bad inroute by migrating an impacted set of user terminals from the bad inroute to one or more others of the plurality of inroutes that are not part of the set of bad inroutes, and quarantining the bad inroute, wherein the impacted set of user terminals is a subset of a plurality of user terminals of the satellite communication system that is serviced by the bad inroute;

testing the bad inroute, subsequent to elapsing of a predefined shutdown time, by redistributing a selected user terminal to the bad inroute and monitoring a test-time burst error rate of the bad inroute;

determining, based on the testing, that the test-time burst error rate of the bad inroute no longer exceeds the predetermined threshold; and restoring the bad inroute, based on the determining, by removing the bad inroute from quarantine.

13. The IGM of claim 12, wherein the steps further comprise:

generating and outputting one or more operator notifications responsive to and based on the identifying.

14. The IGM of claim 12, wherein the determining step further comprises:

determining, based on the testing, whether the test-time burst error rate of the bad inroute no longer exceeds the predetermined threshold; and responsive to determining that the test-time burst error rate of the bad inroute still exceeds the predetermined threshold, migrating the selected user terminal away from the bad inroute and repeating the testing step and the determining step, wherein the restoring the bad inroute is performed only in response to the determining that the test-time burst error rate of the bad inroute no longer exceeds the predetermined threshold.

15. The IGM of claim 14, wherein the repeating step comprises increasing the predefined shutdown time so that repeating of the testing step is subsequent to elapsing of a larger amount of time.

16. The IGM of claim 15, wherein the repeating step further comprises:

detecting, subsequent to the increasing the predefined shutdown time and prior to repeating the testing step and the determining step, whether a predefined iteration threshold has been reached; and adding the bad inroute to a persistent quarantine list responsive to detecting that the predefined iteration threshold has been reached, wherein the testing step and the determining step are repeated only responsive to detecting that the predefined iteration threshold has not been reached.

17. The IGM of claim 12, wherein the testing step comprises selecting the selected user terminal to redistribute to the bad inroute based on determining that traffic from the selected user terminal presently exhibits a low data error rate and/or that the selected user terminal is presently carrying a low traffic level.

18. The IGM of claim 12, wherein:

the monitoring step comprises:

monitoring one or more long-term burst error rates over a timeframe associated with the monitor-time, each long-term burst error rate representing a prevalence of burst errors detected during elapsing of a long timer; and monitoring a plurality of short-term burst error rates over the timeframe associated with the monitor-time, each short-term burst error rate representing a prevalence of burst errors detected during elapsing of a short timer, wherein each iteration of the long timer encompasses a plurality of iterations of the short timer; and the identifying step comprises identifying the set of bad inroutes as those of the plurality of inroutes that have burst error rates exceeding a predetermined threshold according to both the long-term burst error rates and the short-term burst error rates.

19. The IGM of claim 12, wherein:

each of the plurality of inroutes is part of one of a plurality of inroute groups, such that each bad inroute is part of a corresponding inroute group; and the migrating the impacted set of user terminals is from the bad inroute to one or more others of the plurality of inroutes that are not part of the set of bad inroutes and are part of the corresponding inroute group.

20. The IGM of claim 19, wherein the identifying comprises:

comparing the burst error rate of the bad inroute to burst error rates of other inroutes in the corresponding inroute group; and identifying the set of bad inroutes as those of the plurality of inroutes that have burst error rates exceeding a predetermined threshold relative to the burst error rates of other inroutes in the corresponding inroute group.

* * * * *